United States Patent
Hofmeister et al.

(12) 
(10) Patent No.: US 6,500,559 B2
(45) Date of Patent: *Dec. 31, 2002

(54) MULTIPLE LAYER FILM WITH AMORPHOUS POLYAMIDE LAYER

(75) Inventors: Frank M. Hofmeister, Mauldin, SC (US); Thomas D. Kennedy, Simpsonville, SC (US); Carlo E. Musco, Essendon Victoria (AU); Paul J. Satterwhite, Simpsonville, SC (US); G. Vince Sharps, Greer, SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/072,075

(22) Filed: May 4, 1998

(65) Prior Publication Data
US 2001/0010846 A1 Aug. 2, 2001

(51) Int. Cl.[7] .................. B32B 27/08; B32B 27/34; B65D 30/08; B65D 85/00
(52) U.S. Cl. .................. 428/474.4; 428/34.1; 428/34.3; 428/34.8; 428/35.2; 428/35.7; 428/36.91; 428/200; 428/474.7; 428/474.9; 383/109; 383/113; 426/127
(58) Field of Search ................ 428/34.8, 34.9, 428/35.2, 35.7, 36.91, 200, 349, 474.7, 474.9, 476.3, 475.8, 475.5, 476.6, 500, 521, 34.1, 34.3; 383/109, 113; 426/127

(56) References Cited

U.S. PATENT DOCUMENTS

| | | | |
|---|---|---|---|
| 2,252,555 A | 8/1941 | Carothers | 260/78 |
| 2,733,230 A | 1/1956 | Ufer | 260/78 |
| 2,893,980 A | 7/1959 | Ham et al. | 260/78 |
| 3,150,117 A | 9/1964 | Gabler | 260/78 |
| 3,240,732 A | 3/1966 | Ham et al. | 260/18 |
| 3,347,828 A | 10/1967 | Stephens et al. | 260/47 |
| 3,376,270 A | 4/1968 | Ridgway | 260/78 |
| 3,386,964 A | 6/1968 | Twilley | 260/78 |

(List continued on next page.)

FOREIGN PATENT DOCUMENTS

| | | | |
|---|---|---|---|
| AU | B-21685/95 | 9/1997 | .......... B32B/27/08 |
| CA | 2172019 | 9/1996 | |
| CA | 2172019 A | * 9/1996 | |

(List continued on next page.)

OTHER PUBLICATIONS

English–language abstract of 2,471,399 (France); Derwent 003187586.

(List continued on next page.)

Primary Examiner—Harold Pyon
Assistant Examiner—Michael C. Miggins
(74) Attorney, Agent, or Firm—Mark B. Quatt

(57) ABSTRACT

A film includes a core layer having an amorphous polyamide; two intermediate layers, disposed on opposite surfaces of the core layer, including a semicrystalline polyamide; two adhesive layers, each disposed on a surface of the respective intermediate layer, including a polymeric adhesive; and two outer layers, each disposed on a surface of a respective adhesive layer, including an ethylene/alpha olefin copolymer, propylene homopolymer, or propylene/alpha olefin copolymer; and a second outer layer, disposed on a surface of a respective adhesive layer, including amorphous polyamide, semicrystalline polyamide, ethylene/alpha olefin copolymer, propylene homopolymer, or propylene/alpha olefin copolymer. The film can alternatively have a core layer including a polymeric adhesive, and two intermediate layers each having an amorphous polyamide. A method of packaging a product using these films, and a package, are also disclosed.

11 Claims, 3 Drawing Sheets

U.S. PATENT DOCUMENTS

| | | | |
|---|---|---|---|
| 3,489,724 A | 1/1970 | Iwakura et al. ............... | 260/78 |
| 3,573,260 A | 3/1971 | Morello ....................... | 260/78 |
| 3,592,952 A | 7/1971 | Fang .......................... | 260/857 |
| 3,597,400 A | 8/1971 | Kashiro et al. ............ | 260/78 R |
| 3,642,941 A | 2/1972 | Schneider et al. .......... | 260/857 |
| 3,646,156 A | 2/1972 | Schneider et al. .......... | 260/857 |
| 3,650,999 A | 3/1972 | Martins et al. ............... | 260/22 |
| 3,661,832 A | 5/1972 | Stephens .................... | 260/33.4 |
| 3,673,277 A | 6/1972 | Schmitt et al. .............. | 260/857 |
| 3,794,625 A | 2/1974 | Anderson et al. ............. | 260/78 |
| 3,875,129 A | 4/1975 | Herwig et al. ............... | 260/857 |
| 3,922,468 A | 11/1975 | Burke, Jr. et al. .......... | 428/414 |
| 3,962,524 A | 6/1976 | Miyamoto et al. .......... | 428/288 |
| 3,968,071 A | 7/1976 | Miyamoto et al. ........... | 260/37 |
| 3,974,234 A | 8/1976 | Brinkmann et al. ........ | 260/857 |
| 3,979,540 A | 9/1976 | Moffett ....................... | 428/159 |
| 4,016,140 A | 4/1977 | Morello ....................... | 260/47 |
| 4,018,746 A | 4/1977 | Brinkmann et al. .......... | 260/78 |
| 4,053,682 A | 10/1977 | Donermeyer ............... | 428/460 |
| 4,098,860 A | 7/1978 | Etou et al. ................... | 264/171 |
| 4,100,223 A | 7/1978 | Meyer et al. ................ | 260/857 |
| 4,133,802 A | 1/1979 | Hachiboshi et al. ........ | 528/502 |
| 4,167,505 A | 9/1979 | Dunkelberger ............... | 260/37 |
| 4,173,290 A | 11/1979 | Kobayashi et al. ........... | 220/75 |
| 4,224,214 A | 9/1980 | Chen ........................... | 260/37 |
| 4,232,145 A | 11/1980 | Schmid et al. ............... | 528/324 |
| 4,254,169 A | 3/1981 | Schroeder .................... | 428/35 |
| 4,309,528 A | 1/1982 | Keske et al. ................. | 528/324 |
| 4,313,868 A | 2/1982 | Hanson ........................ | 260/37 |
| 4,340,697 A | 7/1982 | Aya et al. .................... | 525/420 |
| 4,357,376 A | 11/1982 | Nattinger et al. ............. | 428/35 |
| 4,369,305 A | 1/1983 | Pagilagan ..................... | 528/338 |
| 4,381,371 A | 4/1983 | Nielinger et al. ............. | 525/66 |
| 4,398,642 A | 8/1983 | Okudaira et al. ........... | 215/1 C |
| 4,404,317 A | 9/1983 | Epstein et al. ............... | 524/538 |
| 4,410,661 A | 10/1983 | Epstein et al. ................ | 525/66 |
| 4,442,254 A | 4/1984 | Aratani ....................... | 524/413 |
| 4,455,417 A | 6/1984 | Vanderkooi, Jr. et al. ... | 528/272 |
| 4,457,960 A | 7/1984 | Newsome .................... | 428/35 |
| 4,461,808 A | 7/1984 | Mollison ................. | 428/475.8 |
| 4,467,084 A | 8/1984 | Kitagawa et al. ........... | 528/324 |
| 4,482,695 A | 11/1984 | Barbee et al. ............... | 528/208 |
| 4,486,507 A | 12/1984 | Schumacher ............. | 428/476.1 |
| 4,500,668 A | 2/1985 | Shimizu et al. ............. | 524/427 |
| 4,501,879 A | 2/1985 | Barbee et al. ............... | 528/268 |
| 4,508,769 A | 4/1985 | Vanderbooi, Jr. et al. ..... | 528/36 |
| 4,515,924 A | 5/1985 | Brooks et al. ............... | 525/432 |
| 4,542,047 A | 9/1985 | Donermeyer et al. .... | 427/374.4 |
| 4,640,852 A | 2/1987 | Ossian ......................... | 428/35 |
| 4,695,491 A | 9/1987 | Kondo et al. ................. | 428/35 |
| H469 H | 5/1988 | Deak ........................... | 428/35 |
| 4,746,562 A | 5/1988 | Fant ............................ | 428/213 |
| 4,767,651 A | 8/1988 | Starczewski et al. .......... | 428/35 |
| 4,788,249 A | 11/1988 | Maresca et al. ............... | 525/66 |
| 4,800,129 A | 1/1989 | Deak ........................ | 428/474.4 |
| 4,818,592 A | 4/1989 | Ossian ......................... | 428/474 |
| 4,826,955 A | 5/1989 | Akkapeddi et al. .......... | 528/324 |
| 4,911,963 A | 3/1990 | Lustig et al. ............. | 428/36.91 |
| 5,006,384 A | 4/1991 | Genske ....................... | 428/36.7 |
| 5,039,565 A | 8/1991 | Deyrup ....................... | 428/35.7 |
| 5,053,259 A | 10/1991 | Vicik ........................ | 428/474.4 |
| 5,110,855 A | 5/1992 | Blatz .......................... | 524/441 |
| 5,139,805 A | 8/1992 | Tada et al. ................... | 426/412 |
| 5,208,082 A | 5/1993 | Chou ........................ | 428/36.6 |
| 5,482,771 A * | 1/1996 | Shah .......................... | 428/349 |
| 5,491,009 A | 2/1996 | Bekele ....................... | 428/35.7 |
| 5,707,750 A | 1/1998 | Degrassi et al. .......... | 428/475.8 |
| 5,750,262 A | 5/1998 | Gasse et al. ............... | 428/423.5 |
| 6,068,933 A | 5/2000 | Shepard et al. .......... | 428/474.4 |
| 6,149,993 A * | 11/2000 | Parks et al. ................. | 428/34.2 |

FOREIGN PATENT DOCUMENTS

| | | |
|---|---|---|
| EP | 0 227 053 | 12/1986 |
| EP | 287839 A2 * | 10/1988 |
| EP | 465681 A1 * | 1/1992 |
| EP | 0465681 | 1/1992 |
| EP | 465931 A2 * | 1/1992 |
| EP | 0465931 | 1/1992 |
| FR | 2 471 399 | 6/1981 |
| GB | 1049987 | 11/1965 |
| GB | 1250877 | 10/1971 |
| NZ | 22263 AZ | 11/1987 |
| WO | WO 98/28132 | 7/1998 |

OTHER PUBLICATIONS

Polymer Modification; Modified Nylons, DuPont Aust., Melb 61 35212676, Jul. 12, 1990; pp. 418–421.

Property And Extrusion Guide, SELAR PA 3426, SELAR PA—Nylon 6 Blends, Amorphous Nylon Resin; pp. 1–5.

Schotland Business Research, Inc., Proceedings of the Fifth Annual International Coextrusion Conference and Exhibition COEX'85,Oct. 9, 1985; Princeton, NJ, USA, p. 171–187.

Trigon Packaging Systems (NZ) Ltd., New Film Co–extrusion Developments in New Zealand and Australia; R.A. Cassey; p. 111–128.

EMS–Chemie AG, Zurich, Switzerland; Emser Industries; Engineering Resins; Grivory G21; 11 pages.

Mitsubishi Kasei Corporation; Novamid X21; 8 pages.

World Link, Partnering for your Global Packaging Solutions; DuPont Packaging; vol. 1, Spring 1998.

English language abstract, AU 9539110–A; "Multilayer film for use in packaging . . . "; Jun. 20, 1996; W. R. Grace & Co.–Conn.

English language abstract, AU 9662133–A; "Multilayer film used as packaging film, . . . "; Jun. 5, 1997; W. R. Grace & Co.–Conn.

English language abstract, EP–685510–A; "Biaxially oriented amide film for easily un–s . . . "; Dec. 6, 1995; Unitika.

English language abstract, EP–755777–A; "Composite films with good deep draw and low . . . ", Jan. 29, 1997; Wolff Walsrode AG.

English language abstract, EP–755778–A; "Barrier films of amide and olefin(s) that do . . . "; Jan. 29, 1997; Wolff Walsrode AG.

English language abstract, DE 19504058–A; "Heat, oil and solvent resistant thermoplastic . . . "; Aug. 14, 1996; BASF AG.

English language abstract, DE 19530952–A; "Sterilisation resistant, deep drawable, heat . . . "; Feb. 27, 1997; Wolff Walsrode AG.

English language abstract, JP 08300583–A; "Multilayer film useful esp. for packing food . . . "; Nov. 19, 1996; Sumitomo Bakelite Co.Ltd.

English language abstract, JP 08332703–A; "Multilayer film used for food packaging–com . . . "; Dec. 17, 1996; Sumitomo Bakelite Co Ltd.

English language abstract, JP 9155997–A; "Laminated tube container for cosmetic, foods . . . "; Jun. 17, 1997; Dainippon Printing Co Ltd.

English language abstract, WO 9612616–A; "Retortable, high oxygen barrier polymeric film . . . "; May 2, 1996; Allied–Signal Inc.

* cited by examiner

MULTIPLE LAYER FILM WITH AMORPHOUS POLYAMIDE LAYER

FIELD OF THE INVENTION

The present invention relates to a thermoplastic film that can be used to make packages for a wide variety of food and non-food products.

BACKGROUND OF THE INVENTION

Vertical form/fill/seal (VFFS) packaging systems have proven to be very useful in packaging a wide variety of flowable products. An example of such systems is the Onpack™ flowable food packaging system sold by W. R. Grace & Co.-Conn. through its Grace Packaging group. The VFFS process is known to those of skill in the art, and described for example in U.S. Pat. No. 4,589,247 (Tsuruta et al), incorporated herein by reference. A flowable product is introduced through a central, vertical fill tube to a formed tubular film having been sealed transversely at its lower end, and longitudinally. The pouch is then completed by sealing the upper end of the tubular segment, and severing the pouch from the tubular film above it.

The choice of packaging materials is important, and should be matched to the intended end use of the pouch.

Several properties are often desirable in such pouches.

Dimensional stability is of great importance in VFFS systems. In such systems, the equipment fills a pouch to a certain level. If the film stretches, too much product is put into the pouch. This phenomenon makes it difficult to standardize pouch dimensions, which leads for example to difficulty in packing off of pouches in shipping boxes of pre-determined size.

Sometimes a pouch material is used to package a product, such as an aqueous liquid food product, at an elevated temperature of 170 to 210° F. This is known as a hot fill process. Sometimes the pouch, after filling, is exposed to retort conditions. In either case, the dimensional stability of the package is severely tested, and the possibility of package distortion increases.

The package material is preferably stiff (i.e. has a high modulus), especially at high temperatures. This is often necessary because the film tracks more easily on a packaging machine. Also, a hot fin seal can stretch undesirably; therefore, to preserve seal integrity, the ability to package at high speeds is limited by the degree to which hot seals will elongate or stretch. If a heavy load, e.g. 5 to 20 pounds of shredded cheese, is thrust into a pouch with transverse seals just formed, these seals are still hot and the pouch, or the seal area of the pouch, can deform. More uniform package length is related to more uniform package weight, which is important to the food processor in order to provide packages with consistent weights.

Good tensile strength is necessary in films used for such applications. Where flowable foods are packaged, as in many VFFS applications, the hydrostatic pressure of many oil and water based foods requires a tough, impact and abuse resistant packaging material that will maintain its structural integrity during the packaging process, and subsequent distribution and storage.

For hot fill and retort applications, heat resistance is essential to avoid package distortion or degradation of the film itself, or of the transverse and longitudinal seals associated with the VFFS process.

Oxygen barrier properties are also essential in end-uses where the product is susceptible to oxidative degradation.

Depending on the packaging process, form of the package, and nature of the product, physical properties such as barrier to ultraviolet light, surface printability, clarity, flatness, thermoformability, and low tear initiation and propagation (for easy-open packages) may become significant.

The inventors have found that a combination of many of these properties is possible through the use of at least one layer consisting essentially of amorphous polyamide in a multilayer thermoplastic film.

SUMMARY OF THE INVENTION

In a first aspect, a multilayer film comprises a core layer consisting essentially of an amorphous polyamide; two intermediate layers, disposed on opposite surfaces of the core layer, comprising a semicrystalline polyamide; two adhesive layers, each disposed on a surface of the respective intermediate layer, comprising a polymeric adhesive; and two outer layers, each disposed on a surface of a respective adhesive layer, comprising a material selected from the group consisting of amorphous polyamide, semicrystalline polyamide, ethylene/alpha olefin copolymer, propylene homopolymer, and propylene/alpha olefin copolymer.

In a second aspect, a multilayer film comprises a core layer comprising an amorphous polyamide adhesive; two intermediate layers, disposed on opposite surfaces of the core layer, consisting essentially of an amorphous polyamide; two adhesive layers, each disposed on a surface of the respective intermediate layer, comprising a polymeric adhesive; and two outer layers, each disposed on a surface of the respective adhesive layer, comprising a material selected from the group consisting of amorphous polyamide, semicrystalline polyamide, ethylene/alpha olefin copolymer, propylene homopolymer, and propylene/alpha olefin copolymer.

In a third aspect, a method of packaging a food product comprises providing a rollstock film, the film comprising a core layer consisting essentially of an amorphous polyamide; two intermediate layers, disposed on opposite surfaces of the core layer, comprising a semicrystalline polyamide; two adhesive layers, each disposed on a surface of the respective intermediate layer, comprising a polymeric adhesive; and two outer layers, each disposed on a surface of a respective adhesive layer, comprising a material selected from the group consisting of amorphous polyamide, semicrystalline polyamide, ethylene/alpha olefin copolymer, propylene homopolymer, and propylene/alpha olefin copolymer; forming the film into a tube in a vertical/form/fill/seal process; filling the tube with a food product; and closing the tube to form a sealed pouch containing the food product.

In a fourth aspect, a package comprises a flowable food product; and a pouch containing the food product, the pouch made from a film comprising a core layer consisting essentially of an amorphous polyamide; two intermediate layers, disposed on opposite surfaces of the core layer, comprising a semicrystalline polyamide; two adhesive layers, each disposed on a surface of the respective intermediate layer, comprising a polymeric adhesive; and two outer layers, each disposed on a surface of a respective adhesive layer, comprising a material selected from the group consisting of amorphous polyamide, semicrystalline polyamide, ethylene/ alpha olefin copolymer, propylene homopolymer, and propylene/alpha olefin copolymer.

In a fifth aspect, a method of packaging a food product comprises providing a rollstock film, the film comprising a core layer comprising an amorphous polyamide adhesive;

two intermediate layers, disposed on opposite surfaces of the core layer, consisting essentially of an amorphous polyamide; two adhesive layers, each disposed on a surface of the respective intermediate layer, comprising a polymeric adhesive; and two outer layers, each disposed on a surface of the respective adhesive layer, comprising a material selected from the group consisting of amorphous polyamide, semicrystalline polyamide, ethylene/alpha olefin copolymer, propylene homopolymer, and propylene/alpha olefin copolymer; forming the film into a tube in a vertical/form/fill/seal process; filling the tube with a food product; and closing the tube to form a sealed pouch containing the food product.

In a sixth aspect, a package comprises a flowable food product; and a pouch containing the food product, the pouch made from a film comprising a core layer comprising an amorphous polyamide adhesive; two intermediate layers, disposed on opposite surfaces of the core layer, consisting essentially of an amorphous polyamide; two adhesive layers, each disposed on a surface of the respective intermediate layer, comprising a polymeric adhesive; and two outer layers, each disposed on a surface of the respective adhesive layer, comprising a material selected from the group consisting of amorphous polyamide, semicrystalline polyamide, ethylene/alpha olefin copolymer, propylene homopolymer, and propylene/alpha olefin copolymer; forming the film into a tube in a vertical/form/fill/seal process; filling the tube with a food product; and closing the tube to form a sealed pouch containing the food product.

Definitions

"Adhesive" herein refers to polymeric adhesive, more preferably an olefin polymer or copolymer having an anhydride functionality grafted thereon and/or copolymerized therewith and/or blended therewith.

"Amorphous polyamide" herein refers to those polyamides which are lacking in crystallinity as shown by the lack of an endotherm crystalline melting peak in a Differential Scanning Calorimeter (DSC) test (ASTM D-3417). Examples of such polyamides include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl) methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine. Examples of polyamides that can be used include those amorphous polymers prepared from the following dicarboxylic acids: isophthalic acid, terephthalic acid, alkyl substituted iso- and ter-ephthalic acid, adipic acid, sebacic acid, butane dicarboxylic acid, and the like. The diamines and diacids mentioned above can be combined as desired, provided the resulting polyamide is amorphous. That is, an aliphatic diamine can generally be combined with an aromatic diacid, or an aromatic diamine can generally be combined with an aliphatic diacid to give suitable amorphous polyamides. Preferred amorphous polyamides are those in which either the diamine or the diacid moiety is aromatic, and the other moiety is aliphatic. The aliphatic groups of these polyamidesides preferably contain between 4 and 12 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms.

"Amorphous polyamide adhesive" herein refers to those polymeric materials which bond a layer of amorphous polyamide to a layer comprising another polymer or blend of polymers. Preferred polymeric materials include semicrystalline polyamide; anhydride grafted polymers such as anhydride grafted ethylene/1-butene copolymer, anhydride grafted ethylene/1-hexene copolymer, and anhydride grafted ethylene/1-octene copolymer; ethylene/acrylic acid copolymer; and ethylene/methacrylic acid copolymer.

"Anhydride functionality" herein refers to any form of anhydride functionality, such as the anhydride of maleic acid, fumaric acid, etc., whether grafted onto a polymer, copolymerized with a polymer, or blended with one or more polymers, and is also inclusive of derivatives of such functionalities, such as acids, esters, and metal salts derived therefrom.

"Core layer" herein refers to the central layer of a multi-layer film.

"Ethylene/alpha-olefin copolymer" (EAO) herein refers to copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. EAO includes such heterogeneous materials as linear medium density polyethylene (LMDPE), linear low density polyethylene (LLDPE), and very low and ultra low density polyethylene (VLDPE and ULDPE); as well as homogeneous polymers (HEAO) such as TAFMER™ ethylene/alpha olefin copolymers supplied by Mitsui Petrochemical Corporation and metallocene-catalyzed polymers such as EXACT™ resins supplied by Exxon and AFFINITY™ resins supplied by the Dow Chemical Company. EAO includes long chain branched homogeneous ethylene/alpha-olefin copolymer. An EAO can for example, have a density of between 0.916 and 0.945 grams/cc.

"Ethylene/vinyl ester copolymer" (E/VE) herein refers to a copolymer derived from ethylene and an ester such as vinyl acetate, alkyl acrylate, methyl methacrylate, or other monomers, wherein the ethylene derived units in the copolymer are present in major amounts and the ester derived units in the copolymer are present in minor amounts.

"Flowable materials" herein means food or non-food items which are flowable under gravity, or can be pumped, as defined in U.S. Pat. No. 4,521,437 (Storms), incorporated by reference herein in its entirety.

"Heat shrinkable" herein is a property of a material which, when heated to an appropriate temperature above room temperature (for example 96° C.), will have a free shrink of 5% or greater in at least one linear direction.

"High density polyethylene" (HDPE) herein has a density of 0.94 grams per cubic centimeter to 0.96 grams per cubic centimeter.

"Intermediate" herein refers to a layer of a multi-layer film which is between an outer layer and core layer of the film.

"Linear low density polyethylene" (LLDPE) herein has a density in the range of from 0.916 to 0.925 grams per cubic centimeter.

"Linear medium density polyethylene" (LMDPE) herein has a density from 0.926 grams per cubic centimeter to 0.939 grams per cubic centimeter.

"Outer layer" herein refers to what is typically an outermost, usually surface layer of a multi-layer film, although additional layers and/or films can be adhered to it.

"Polyamide" herein refers to both polyamides and copolyamides, and means a polymer in which amide linkages (—CONH—) occur along the molecular chain. Examples are nylon 6, nylon 11, nylon 12, nylon 66, nylon 69, nylon 610, nylon 612, nylon 6/66, and amorphous polyamide.

"Polymer" herein refers to homopolymer, copolymer, terpolymer, etc. "Copolymer" herein includes copolymer, terpolymer, etc.

"Propylene/alpha-olefin copolymer" herein refers to copolymers of propylene with one or more comonomers selected from ethylene, and butene-1 (i.e., 1-butene).

"Semicrystalline polyamide" herein refers to polyamides having readily determined crystalline melting points, for example, nylon 6, 9, 11, and 12. Such nylons may also have amorphous regions, and may even have measurable glass transition temperatures.

All compositional percentages used herein are calculated on a "by weight" basis.

"LD" or "MD" herein refers to longitudinal direction or machine direction respectively, synonymous terms for the direction of the film parallel to the path of extrusion. "TD" or "CD" herein refers to transverse or cross direction respectively, synonymous terms for the direction of the film transverse to the path of extrusion.

BRIEF DESCRIPTION OF THE DRAWINGS

A detailed description of preferred embodiments of the invention follows, with reference to the attached drawings, wherein.

DESCRIPTION OF THE PREFERRED EMBODIMENTS

Figure 1:
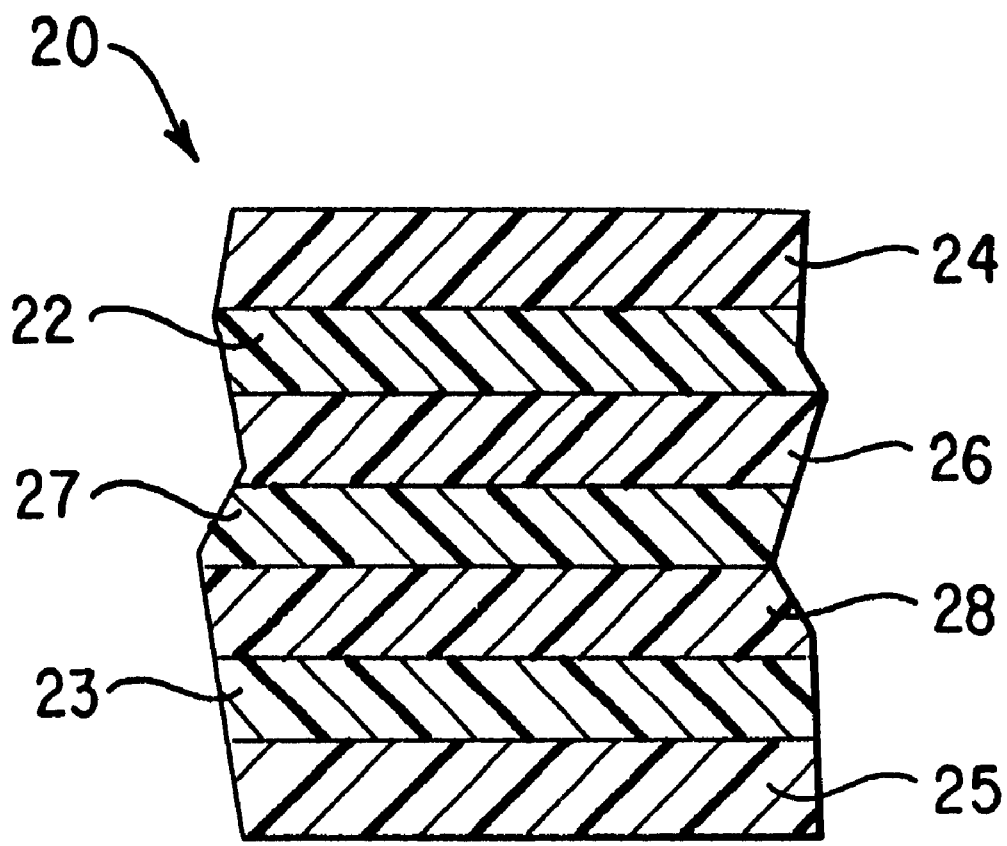
FIG. 1 is a cross-sectional view of a seven layer film.

Referring to FIG. 1, which is a cross-sectional view of a seven layered embodiment of the present invention, a film 20 comprising a core layer 27, two intermediate layers 26 and 28, two polymeric adhesive layers 22 and 23, and two outer layers 24 and 25. Outer layers 24 and 25 are preferably surface layers.

Core layer 27 consists essentially of an amorphous polyamide. Preferred amorphous polyamides include Grivory™ G21 nylon from EMS, Selar™ PA 3426 from DuPont, and Novatec™ X21 from Mitsubishi Chemical. These commercial materials are nylon 6I/6T.

Small amounts of additives such as slip or antiblock agents, pigments, processing aids and the like can be included in core layer 27, as long as they do not materially affect the basic and novel characteristics of the film. Semicrystalline polyamide is not present in core layer 1.

Intermediate layers 26 and 28 comprise semicrystalline polyamide. Preferred semicrystalline polyamides include nylon 6, nylon 11, nylon 12, nylon 66, nylon 69, nylon 610, nylon 612, nylon 6/66, nylon 6/12 copolymer, nylon 6/66 copolymer, nylon 66/610 copolymer, nylon 6/69 copolymer, and blends of any of the above.

Polymeric adhesive layers 22 and 23 comprise a polymeric adhesive, and more specifically an olefin polymer or copolymer having an anhydride functionality grafted thereon and/or copolymerized therewith and/or blended therewith. Preferred polymeric adhesives are anhydride grafted ethylene/1-butene copolymer, anhydride grafted ethylene/1-hexene copolymer, and anhydride grafted ethylene/1-octene copolymer. Amorphous polyamide adhesives include semicrystalline polyamide, and anhydride grafted polymers.

Outer layers 24 and 25 each comprise a polymer selected from the group consisting of amorphous polyamide, semicrystalline polyamide, ethylene/alpha-olefin copolymer, propylene homopolymer, and propylene/alpha-olefin copolymer. Preferred materials, depending on the desired end-use application, are amorphous polyamide, semicrystalline polyamide, linear low density polyethylene (linear ethylene/$C_4$–$C_{10}$ alpha-olefin copolymer), metallocene-catalyzed ethylene/$C_4$–$C_{10}$ alpha-olefin copolymer, and propylene/ethylene copolymer.

In an alternative embodiment, a film is like that just described and shown in FIG. 1, except that the core layer comprises an amorphous polyamide adhesive, and the two intermediate layers 26 and 28 consist essentially of amorphous polyamide. The polymeric adhesive and the amorphous polyamide can be any of those disclosed herein. In this alternative embodiment, the two outer layers both comprise any of the materials disclosed above.

In the alternative embodiment just described, semicrystalline polyamide is not present in intermediate layers 26 and 28.

Figure 2:
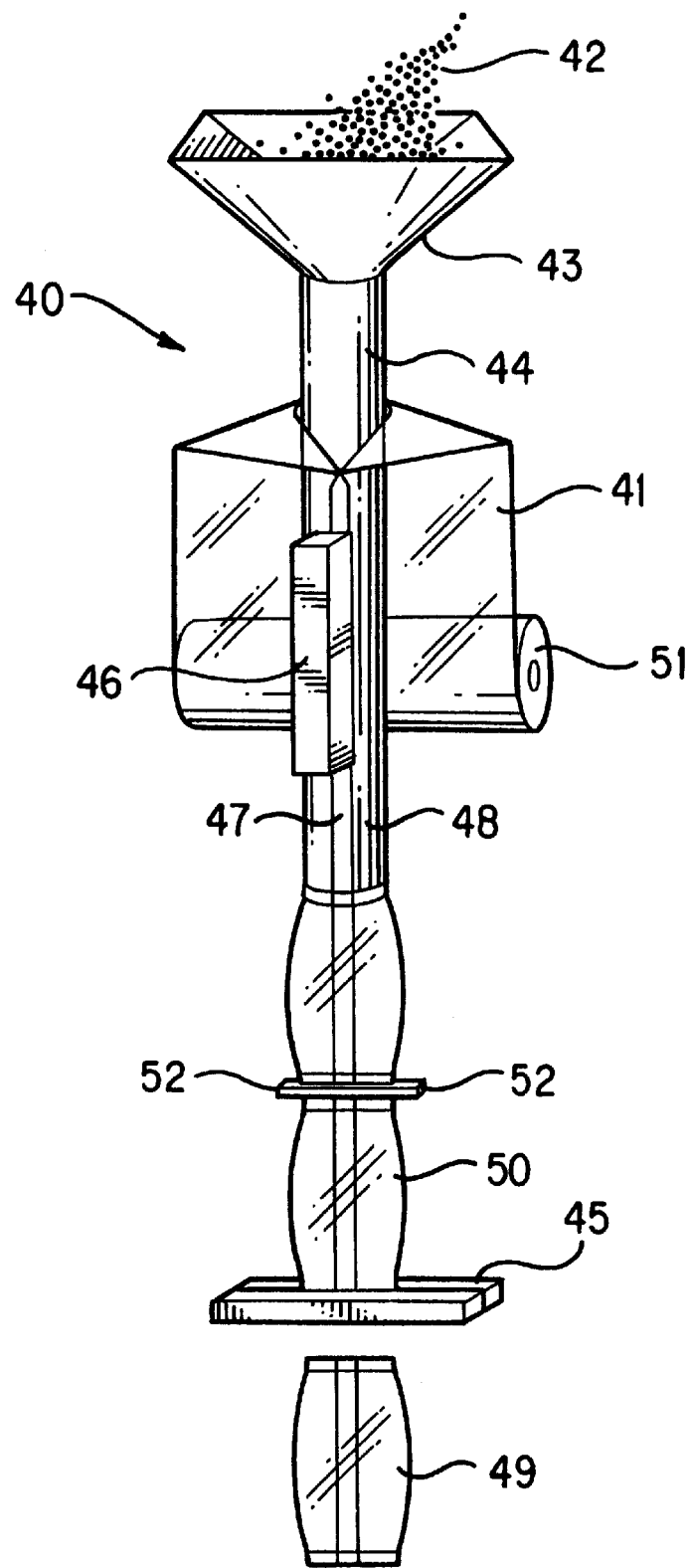
FIG. 2 illustrates a vertical form fill and seal apparatus which can be used in connection with the film and method of the present invention, to make a package of the present invention.

In FIG. 2, a vertical form fill and seal apparatus 40 is schematically illustrated. Vertical form fill and seal equipment and processes are well known to those of skill in the packaging art. The following documents disclose a variety of equipment suitable for vertical form fill and seal: U.S. Pat. Nos. 2,956,383; 3,340,129 to J. J. Grevich; U.S. Pat. No. 3,611,657, to Kiyoshi Inoue, et. al.; U.S. Pat. No. 3,703,396, to Inoue, et. al.; U.S. Pat. No. 4,103,473, to Bast, et. al.; U.S. Pat. No. 4,589,247; U.S. Pat. No. 4,532,752, to Taylor; U.S. Pat. No. 4,532,753, to Kovacs; and U.S. Pat. No. 4,571,926, to Scully, all incorporated by reference herein in their entirety. Apparatus 40 utilizes multilayer film 41 according to the present invention. Thus, film 41 can be any of films 20, 60, 70 as described herein. Product 42, to be packaged, is supplied to apparatus 40 from a source (not illustrated), from which a predetermined quantity of product 42 reaches upper end portion of forming tube 44 via funnel 43, or other conventional means. The packages are formed from the film in a lower portion of apparatus 40, and flexible sheet material 41 from which the bags or packages are formed is fed from roll 51 over certain forming bars (not shown for the sake of clarity), is wrapped about forming tube 44, and is provided with longitudinal seal 47 by longitudinal heat sealing device 46, resulting in the formation of vertically-oriented tube 48. End seal bars 45 operate to close and seal horizontally across the lower end of vertically-sealed tube 48, to form pouch 50 which is thereafter immediately packed with product 42. A means for advancing and/or voiding a portion of the tube 48, such as film drive rollers 52, advance tube 48 and pouch 50 a predetermined distance, after which end seal bars 45 close and simultaneously seal horizontally across the lower end of vertically-sealed tube 48 as well as simultaneously sealing horizontally across upper end of sealed pouch 49, to form a product packaged in sealed pouch 49. The next pouch 50, thereabove, is then filled with a metered quantity of product 42, advanced, and so on. It is also conventional to incorporate with the end seal bars a cut-off knife (not shown) which operates to sever a lower sealed pouch 49 from the bottom of upstream pouch 50.

Figure 3:
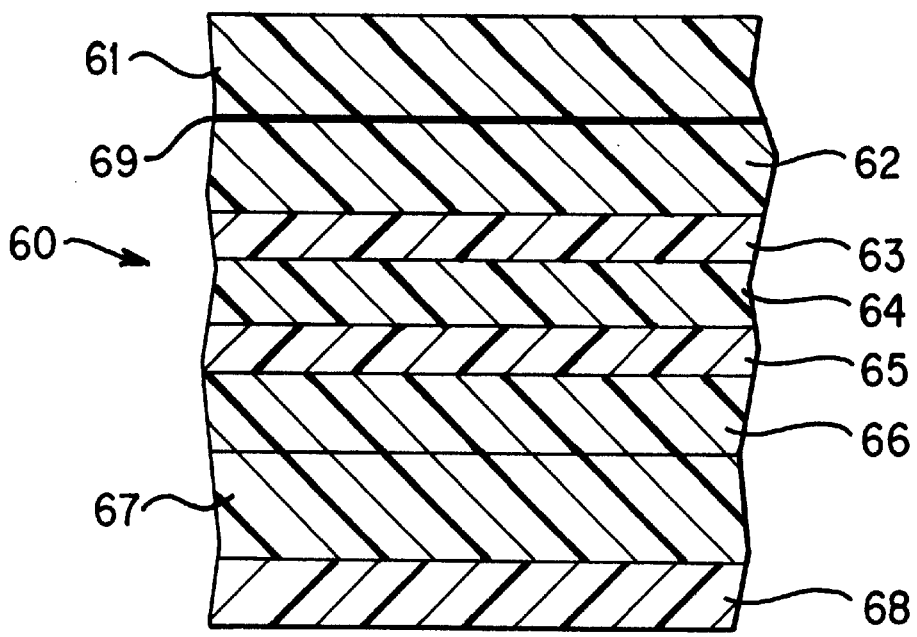
FIG. 3 is a cross-sectional view of an eight layer film.

Referring to FIG. 3, which is a cross-sectional view of an eight layered embodiment of the present invention, a film 60 comprises a core layer 65, two intermediate layers 64 and 66, and two outer layers 62 and 68. Adhesive layers 63 and 67 bond outer layers 62 and 68 respectively to intermediate layers 64 and 66 respectively. The layers for this film can comprise the same materials as disclosed for the equivalent layers in FIG. 1, in either the first embodiment or alternative embodiment discussed above. Thus, core layer 65 can have the same materials as disclosed above for core layer 27 (i.e. an amorphous polyamide or polymeric adhesive); intermediate layers 64 and 66 can comprise the same materials as disclosed above for intermediate layers 26 and 28; and so on.

In FIG. 3, an additional layer 61 is shown adhered to layer 62 at interface 69. This additional material can be any suitable polymeric material, and is preferably a discrete film adhered to layer 62 by a suitable adhesive such as polyurethane. Layer 61 can comprise e.g. a saran, polyester, or nylon film. This film 61 can be unoriented, or monoaxially or biaxially oriented. If layer 61 is intended to function as a sealant, it preferably comprises a polyolefin such as EAO, ionomer, or propylene homopolymer or copolymer. Layer 61 can also be coextruded with the other layers of the film.

Figure 4:
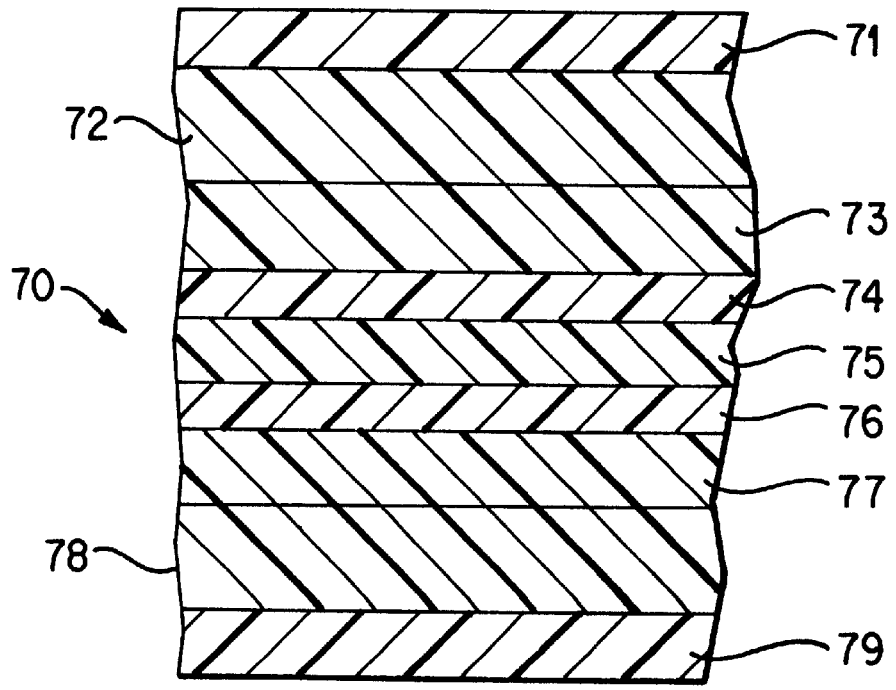
FIG. 4 is a cross-sectional view of a nine layer film.

Referring to FIG. 4, which is a cross-sectional view of a nine layered embodiment of the present invention, a film 70 comprising a core layer 75, two intermediate layers 74 and 76, and two outer layers 72 and 78. Adhesive layers 73 and 77 bond outer layers 72 and 78 respectively to intermediate layers 74 and 76 respectively. An additional layer 71 is shown adhered to layer 72, and an additional layer 79 is shown adhered to layer 78. The layers for this film can comprise the same materials as disclosed for the equivalent layers in FIG. 1, in either the first embodiment or alternative embodiment discussed above. Thus, core layer 75 can comprise the same materials as disclosed above for core layer 27; intermediate layers 74 and 76 can comprise the same materials as disclosed above for intermediate layers 26 and 28, and so on.

The additional layers 71 and 72 can comprise the same materials as those of layer or film 61. In each case, the additional layer or layers can be a discrete film adhered to the adjacent layer by gluing, heat and pressure, or other appropriate bonding technique; or can be made with the remainder of the film in a coextrusion process. Layers 71 and 72 are preferably the same, but can be different from each other.

The invention can be further understood by reference to the examples given below. Final film thicknesses can vary, depending on process, end use application, etc. Typical thicknesses range from 0.1 to 20 mils, more preferably 1 to 10 mils, and especially 2 to 7 mils.

Table 1 identifies the materials used in the examples and comparative examples. The remaining tables describe the formulations and/or properties of films made with these materials.

TABLE 1

| | Material | Tradename | Source |
|---|---|---|---|
| 1 | ADH1 | — | — |
| 2 | ION1 | Surlyn ™1650 | DuPont |
| 3 | PO1 | Escorene ™ PP-4292.E1 | Exxon |
| 4 | ADH2 | Plexar ™PX 114 | Quantum/USI |
| 5 | PET1 | Melinex 800 | ICI |
| 6 | MB1 | 1080864S | Reed Spectrum |
| 7 | NY1 | Capron ™B100WP | Allied Signal |

TABLE 1-continued

| | Material | Tradename | Source |
|---|---|---|---|
| 8 | ADH3 | | |
| 9 | NY2 | Ultramid ™KR-4407 | BASF |
| 10 | PET2 | 48 LB Mylar ™ | DuPont |
| 11 | MB2 | Grilon ™XE 3361 | EMS |
| 12 | ADH4 | Tymor ™1203 | Morton International |
| 13 | PO2 | Dowlex ™2244A | Dow |
| 14 | PO3 | Exact ™ 3027 | Exxon |
| 15 | PO4 | Escorene XW 70.AV | Exxon |
| 16 | EVOH1 | LC-H101BD | EVALCA |
| 17 | NY3 | Ultramid ™ B 35 Natural | BASF |
| 18 | PO5 | Elvax ™ EP 6449 | DuPont |
| 19 | PO6 | Dowlex NG 3347A | Dow |
| 20 | PO7 | SLX-9103 | Exxon |
| 21 | PO8 | Exceed ™ECD-401A | Exxon |
| 22 | ADH5 | Plexar ™PX 107 A | Millenium |
| 23 | PO9 | Escorene ™LD-134.09 | Exxon |
| 24 | ADH6 | Tymor ™1228B | Morton International |
| 25 | PO10 | Escorene ™LD-200.48 | Exxon |
| 26 | MB3 | 10853 | Ampacet |
| 27 | ADH7 | Coreactant 9L23 | Morton International |
| 28 | MB4 | FSU 255E | A. Schulman |
| 29 | ANY1 | Grivory ™ G21 | EMS |
| 30 | EVOH2 | Soarnol ™ ET | Nippon Gohsei |
| 31 | PO11 | Attane ™4201 | Dow |
| 32 | PET3 | Shinplex ™ Polyester PET-SK | Phoenix Films |
| 33 | ADH8 | — | — |
| 34 | PET4 | EG Polyester Film (48 gauge) | STC Films |
| 35 | Add 1 | Micromark #20 Powdered Starch | W-R Industries |
| 36 | MB5 | Conpol ™ 13B | DuPont |
| 37 | PO12 | PE1042CS15 | Rexene |
| 38 | ADH9 | Bynel ™CXA 3095 | DuPont |
| 39 | PO14 | Escorene ™LD-733.66 | Exxon |
| 40 | PO15 | STS-33C | MSI Technology |

ADH1 is the equivalent of a mixture of 100 pounds (11.4 gallons) ADH3, 4 pounds (0.4 gallons) ADH7, and enough ADH8 to result in a mixture containing 35% solids.

ION1 is a zinc salt of ethylene/methacrylic acid copolymer.

PO1 is a propylene homopolymer.

ADH2 is an anhydride grafted ethylene/vinyl acetate copolymer.

PET1 is an uncoated, non-formable polyethylene terephthalate (polyester) film with a thickness of 0.48 mils.

MB1 is a masterbatch having 70% nylon 6, 20% anti-blocking (diatomaceous earth), and 10% slip agent (erucamide).

NY1 is nylon 6 (polycaprolactam).

ADH3 is a urethane with 39.7% ethyl acetate, and 5.0% methylene bisphenyl isocyanate, with a solids content of 59 to 61%.

NY2 is nylon 6 (polycaprolactam).

PET2 is an uncoated polyethylene terephthalate (polyester) film with thickness of 0.48 mils.

MB2 is a masterbatch having nylon 6, with a small amount of an antiblocking agent, and a slip agent.

ADH4 is a major amount of a linear ethylene/butene-1 copolymer blended with a maleic anhydride modified polyethylene and an ethylene/propylene rubber.

PO2 is an ethylene/octene-1 copolymer with a density of 0.916 grams/cc.

PO3 is a single site catalyzed ethylene/butene copolymer with a density of 0.900 grams/cc.

PO4 is a low density polyethylene resin.

EVOH1 is an ethylene/vinyl alcohol copolymer with 38 mole percent ethylene.

NY3 is nylon 6 (polycaprolactam).

PO5 is a blend of 75% ethylene/vinyl acetate copolymer having a vinyl acetate content of 12% by weight of the polymer, 5% propylene homopolymer, and 20% butylene/ethylene copolymer.

PO6 is an ethylene/octene copolymer with a density of 0.917 grams/cubic centimeter.

PO7 is a single site catalyzed ethylene/hexene/butene terpolymer with a density of 0.901 grams/cc.

PO8 is a single site catalyzed ethylene/hexene copolymer with a density of 0.917 grams/cc.

ADH5 is an anhydride modified polyolefin in ethylene/vinyl acetate copolymer.

PO9 is a low density polyethylene resin.

ADH6 is a major amount of ethylene/butene copolymer blended with a maleic anhydride grafted polyethylene.

PO10 is low density polyethylene with a density of 0.917 grams/cc.

MB3 is a masterbatch having linear low density polyethylene and an antiblocking agent (diatomaceous earth).

ADH7 is a urethane with 25.0% ethyl acetate, 9.4% gamma-aminopropyltriethyoxysilane, and 9.4% diethylene glycol.

MB4 is a masterbatch having 67.9% low density polyethylene, 25% diatomaceous earth, 5/0% erucamide, and 0.1% stabilizer.

NY1 is an amorphous copolyamide (6I/6T) derived from hexamethylene diamine, isophthalic acid, and terephthalic acid.

EVOH2 is an ethylene/vinyl alcohol copolymer with 38 mole percent ethylene.

PO11 is an ethylene/octene copolymer with a density of 0.912 grams/cc.

PET3 is an uncoated, non-formable polyethylene terephthalate (polyester) film with a thickness of 0.48 mils.

ADH8 is ethyl ester of acetic acid.

PET4 is an uncoated, biaxially oriented polyethylene terephthalate (polyester) film with a thickness of 0.48 mils.

Add1 is food starch with a small percentage of additives.

MB5 is an ionomer-based anti-block concentrate.

PO12 is a low density polyethylene with a density of 0.922 grams/cc.

ADH9 is an anhydride grafted polyolefin in ethylene/vinyl acetate copolymer.

PO14 is ethylene/vinyl acetate copolymer having a vinyl acetate content of 19.3% by weight of the polymer, and a melt index of 30.

PO15 is a compounded ethylene/vinyl acetate copolymer having a density of 0.916 grams/cc, and a melt index of 1.6.

EXAMPLES

Three film structures containing an amorphous polyamide core were tested on a Hayssen Ultima™ packaging machine. This type of equipment is intended for the packaging of non-flowable dry goods such as IQF applications, cake mixes, shredded cheese, confections, etc.

The films, and the comparative examples ("Comp" in the Tables) discussed below, had the structures shown in Table 2. These were each made by a coextrusion of the layers. The gauge (in mils) of each layer of each film structure is shown below each respective structure in the various tables. The layer farthest to the right in Table 2 and the remaining tables would preferably form the food or product contact layer in a typical packaging application. Examples 1 and 2 a had a total thickness of 4.0 mils. Example 2, and Comp. Example 3, had a total thickness of 4.5 mils. Comp. Example 2 had a total thickness of 3.5 mils. A mil is equal to 0.001 inches, or 25.4 micrometers.

TABLE 2

| Example | Structure | | | | | | | |
|---|---|---|---|---|---|---|---|---|
| 1 | 96% NY2 | ADH9 | 80% NY1 | aNY1 | 80% NY1 | ADH6 | 90% PO8 | 48% PO8 |
|   | 2% MB2 |      | 20%     |      | 20%     |      | 10%     | 48% PO7 |
|   | 2% MB1 |      | aNY1    |      | aNY1    |      | PO10    | 4% MB4  |
|   | 0.52   | 0.76 | 0.26    | 0.8  | 0.26    | 0.32 | 0.76    | 0.32    |
| 2 | 96% NY2 | ADH9 | 80% NY1 | aNY1 | 80% NY1 | ADH6 | 90% PO8 | 48% PO8 |
|   | 2% MB2 |      | 20%     |      | 20%     |      | 10%     | 48% PO7 |
|   | 2% MB1 |      | aNY1    |      | aNY1    |      | PO10    | 4% MB4  |
|   | 0.59   | 1.08 | 0.29    | 0.45 | 0.29    | 0.36 | 1.08    | 0.36    |
| 2a | 96% aNY1 | ADH9 | 80% NY1 | aNY1 | 80% NY1 | ADH6 | 90% PO8 | 48% PO8 |
|   | 2% MB2 |      | 20%     |      | 20%     |      | 10%     | 48% PO7 |
|   | 2% MB1 |      | aNY1    |      | aNY1    |      | PO10    | 4% MB4  |
|   | 0.52   | 0.76 | 0.26    | 0.8  | 0.26    | 0.32 | 0.76    | 0.32    |
| Comp. 2 | 96% NY2 | ADH9 | 80% NY1 | ADH6 | 80% NY1 | ADH6 | 90% PO8 | 48% PO8 |
|   | 2% MB2 |      | 20%     |      | 20%     |      | 10%     | 48% PO7 |
|   | 2% MB1 |      | aNY1    |      | aNY1    |      | PO10    | 4% MB4  |
|   | 0.46   | 0.87 | 0.23    | 0.28 | 0.23    | 0.28 | 0.87    | 0.28    |
| Comp. 3 | 96% NY2 | ADH9 | 85% NY3 | ADH6 | 85% NY3 | ADH6 | 90% PO2 | 96% PO8 |
|   | 2% MB2 |      | 15%     |      | 15%     |      | 10%     | 4% MB4  |
|   | 2% MB1 |      | aNY1    |      | aNY1    |      | PO10    |         |
|   | 0.59   | 1.12 | 0.29    | 0.45 | 0.29    | 0.36 | 1.04    | 0.36    |

Examples 1, 2, and 2a were evaluated for their machinability characteristics versus Comp. Examples 2 and 3. Example 2a contained an amorphous polyamide outer layer as well as a core layer of amorphous polyamide. This film did not "machine", i.e. track on the package machine, very well. The amorphous polyamide outer layer, in this case a surface layer of the film, resulted in sticking along the horizontal jaws of the machine. This problem prevented any extended runs. Example 1, with an amorphous polyamide core forming 20% of the total film thickness, ran without any problems at 40 packages/minute. The added stiffness provided by the amorphous polyamide appeared to assist with cutting and any stretching resulting at the horizontal jaws. In order to attain the optimum vertical seal appearance, the platen seal bar of the machine was coated with Teflon™ tape. The Teflon along with the 20% amorphous polyamide core did result in higher operating temperatures; however, this did not adversely affect the seals or the machining of this structure. Example 2, with an amorphous polyamide core forming 10% of the total film thickness, ran very similar to Example 1, showing no signs of any problems. Teflon tape was still needed to attain the optimum vertical seal appearance.

All three film structures exhibited significant abuse and puncture resistance which was tested on an Burst Tester. The Burst Tester is constructed as follows. Upper and lower rectangular metal plates are mounted on a two-piece hinged welded aluminum frame. Upper and lower "arms" of the framework are each about 26" long and form a rigid "lever arm" for the mounting of the two rectangular plates. The plates are mounted so that their surfaces will mate when the "arms" are brought together. The plates are positioned about 3" from the hinge on the arms of the welded frame leaving about 12" to 14" protruding on the opposite side of the plates for extra leverage. The upper plate measures 15"×8¾"; the lower plate measures 14"×8". In the exact centroid of the upper plate is a circular opening covered by a rubber diaphragm to which a pressure-transducing tube is attached, and in turn connected to an Aschcroft™ pressure gauge which protrudes above the top plate. The purpose of this arrangement is to generate a hydrostatic or pneumatic pressure within sealed, filled test pouches by squeezing the lever arms together in a bellows fashion. The induced pressure in the test sample is in turn transferred through the pressure transducing tube mounted in the circular opening drilled in the upper plate, to the pressure gauge, allowing a quantitative psig reading to be taken.

In operation, a fluid-filled (air) heat sealed pouch was in each test sequence placed squarely between two plates mounted on the two-piece, bellows-like hinged frame. The test unit was placed on the floor and pressure applied by hand or foot until a rupture-type failure occurs. Maximum hydrostatic pressure generated is then recorded from a sliding needle-stop marker which is part of the pressure gauge. Some pouches exceeded the maximum graduation on the pressure gauge, which was 15 psig, i.e. some pouches withstood, without failure, the force exerted by an adult human standing at the end of the lever arm.

The results are shown in Table 3 below. The structure of Comp. 5 can be found in Table 4.

TABLE 3

| Example | Burst Test Results (psig) |
|---------|---------------------------|
| 1       | >15                       |
| 2       | >15                       |
| 2a      | >15                       |
| Comp. 2 | 6                         |
| Comp. 5 | 8.5                       |

It can be seen from Table 3 that films of the invention reached the limits of the tester without any failures resulting. Beneficial attributes of Examples 1, 2, and 2a are their resistance to stretching, ease of cutting, and the added stiffness for advancing the film over the spreaders. In comparison, both of the comparative films tested failed well below the 15 psig threshold.

A separate study was conducted to measure the flex crack resistance of amorphous polyamide containing structures. One additional film of the invention was evaluated (Example 3). Several Comparative Examples were used as controls for this evaluation. These are identified in Table 4.

TABLE 4

| Example | Structure | | | | | | | |
|---------|-----------|---|---|---|---|---|---|---|
| 3       | 96% NY2   | ADH9 | 80% NY1 | aNY1 | 80% NY1 | ADH6 | 90% PO8 | 48% PO8 |
|         | 2% MB2    |      | 20%     |      | 20%     |      | 10%     | 48% PO7 |
|         | 2% MB1    |      | aNY1    |      | aNY1    |      | PO10    | 4% MB4  |
|         | 0.40      | 0.72 | 0.19    | 0.30 | 0.19    | 0.24 | 0.72    | 0.24    |
| Comp. 4 | 96% NY2   | ADH9 | 85% NY3 | ADH6 | 85% NY3 | ADH6 | 90% PO2 | 96% PO8 |
|         | 2% MB2    |      | 15%     |      | 15%     |      | 10%     | 4% MB4  |
|         | 2% MB1    |      | aNY1    |      | aNY1    |      | PO10    |         |
|         | 0.45      | 0.87 | 0.23    | 0.35 | 0.23    | 0.28 | 0.81    | 0.28    |
| Comp. 5 | 96% NY2   | ADH9 | 80% NY1 | ADH6 | 80% NY1 | ADH6 | 90% PO8 | 48% PO8 |
|         | 2% MB2    |      | 20%     |      | 20%     |      | 10%     | 48% PO7 |
|         | 2% MB1    |      | aNY1    |      | aNY1    |      | PO10    | 4% MB4  |
|         | 0.60      | 1.12 | 0.29    | 0.36 | 0.29    | 0.36 | 1.12    | 0.36    |
| Comp. 6 | 88% PO8   | ADH4 | 75% NY2 | EVOH | 75% NY2 | ADH9 | 98% NY2 |         |
|         | 10%       |      | 25%     | 2    | 25%     |      | 2% MB2  |         |
|         | PO10      |      | aNY1    |      | aNY1    |      |         |         |
|         | 2% MB3    |      |         |      |         |      |         |         |
|         | 1.24      | 0.32 | 0.26    | 0.40 | 0.26    | 1.0  | 0.52    |         |
| Comp.   | 88% PO8   | ADH4 | 75% NY2 | EVOH | 75% NY2 | ADH9 | 98% NY2 |         |

TABLE 4-continued

| Example | Structure | | | | | | | | |
|---|---|---|---|---|---|---|---|---|---|
| 7 | 10% PO10 2% MB3 | | 25% aNY1 | 2 | 25% aNY1 | | 2% MB2 | | |
| | 0.93 | 0.24 | 0.19 | 0.30 | 0.20 | 0.75 | 0.39 | | |
| Comp. 8 | 97% PO7 3% MB4 | ADH5 | ADH4 | EVOH 2 | ADH4 | ADH5 | PO12 | ADH1 | PET1 |
| | 1.00 | 0.20 | 0.13 | 0.25 | 0.13 | 0.17 | 0.62 | 0.02 | 0.48 |

The samples were subjected to ASTM F392-74-D (Gelbo flex test) which subjects the film through 20 cycles on a Model 100 Flex Tester (Manufactured by Rogers International). After completion of the flex testing, samples were tested for oxygen transmission in accordance with ASTM 3985. The results are shown in Table 5.

TABLE 5

Oxygen Transmission Rate Results (cc/sq. m./day/)

| Sample ID | Sample 1 | Sample 2 | Average |
|---|---|---|---|
| Example 1 | 18.7 | 18.8 | 18.75 |
| Example 2 | 24.4 | 24.6 | 24.5 |
| Example 3 | 35.4 | 33.3 | 34.35 |
| Comp. 4 | 40.1 | 41.9 | 41.0 |
| Comp. 5 | 35.2 | 36.0 | 35.6 |
| Comp. 6 | 1.35 | 1.29 | 1.32 |
| Comp. 7 | 3.43 | 2.75 | 3.09 |
| Comp. 8 | 1.69 | 1.52 | 1.6 |

These results indicate that all of the films tested withstood the flex crack test without showing any signs of barrier loss. This also confirms that no pinholes were found in the stressed area subjected to the oxygen transmission rate testing. These results are unexpected, in that the conventional commercial understanding is that films containing amorphous polyamide have poor flex crack resistance.

Some commercial films can undesirably stretch while being filled in a VFFS system with a high temperature food product such as hot tomato sauce. This stretching is believed to be a significant factor in weight variation among pouches. Developmental vertical form/fill/seal (VFFS) structures which should exhibit increased performance in this area were made and needed to be evaluated for fitness-for-use (FFU). Evaluation of oxygen barrier properties was necessary before the other FFU criteria—abuse resistance, stretch-resistance, sealability, machinability, etc.—could be tested in a commercial setting. Two additional films in accordance with the invention, and five comparative Examples, were thus evaluated using a low oxygen transmission imaging system (LOTIS) for estimated oxygen transmission rates (OTR's) under hydrating conditions. The LOTIS methodology is described in U.S. Pat. No. 5,316,949 (Bull et al.), U.S. Pat. No. 5,483,819 (Barmore et al.), and U.S. Pat. No. 5,583,047 (Blinka et al.), all incorporated by reference herein in their entirety. Low oxygen transmission imaging system (LOTIS) testing was used based on its speed and the ability of the system to mimic real package hydration conditions. The objective of this evaluation was to obtain a relative measure of the oxygen barrier properties of each of the materials, under actual use conditions, to determine the effect of partial hydration on each formulation.

The films are identified in Table 6. Comparative Examples 9 and 10 were made by conventional tubular coextrusion as blown films. The remaining films were made by tubular cast coextrusion.

TABLE 6

| Example | Structure | | | | | | |
|---|---|---|---|---|---|---|---|
| 4 | 70% PO8 30% PO4 | ADH6 | NY3 | aNY1 | NY3 | ADH6 | 70% PO8 30% PO4 |
| | 1.38 | 0.38 | 0.44 | 1.10 | 0.44 | 0.38 | 1.38 |
| 5 | 70% PO6 30% PO4 | ADH6 | 80% NY3 20% aNY1 | aNY1 | 80% NY3 20% aNY1 | ADH6 | 70% PO6 30% PO4 |
| | 1.38 | 0.38 | 0.71 | 0.55 | 0.71 | 0.38 | 1.38 |
| Comp. 9 | 70% PO6 30% PO4 | ADH6 | 80% NY3 20% aNY1 | EVOH2 | 80% NY3 20% aNY1 | ADH6 | 70% PO6 30% PO4 |
| | 1.38 | 0.38 | 0.71 | 0.55 | 0.71 | 0.38 | 1.38 |
| Comp. 10 | 70% PO6 30% PO4 | ADH6 | 80% NY3 20% aNY1 | EVOH2 | 80% NY3 20% aNY1 | ADH6 | 70% PO6 30% PO4 |
| | 0.87 | 0.25 | 0.35 | 0.56 | 0.35 | 0.25 | 0.87 |
| Comp. 11 | 70% PO8 30% PO4 | ADH4 | ANY1 | EVOH2 | aNY1 | ADH4 | 70% PO8 30% PO4 |
| | 1.65 | 0.38 | 0.44 | 0.55 | 0.44 | 0.39 | 1.65 |
| Comp. 12 | 70% PO8 30% PO4 | ADH6 | NY3 | 60% aNY1 40% EVOH2 | NY3 | ADH6 | 70% PO8 30% PO4 |
| | 1.38 | 0.38 | 0.44 | 1.10 | 0.44 | 0.38 | 1.38 |
| Comp. 13 | 70% PO8 30% PO4 | ADH6 | NY3 | EVOH2 | NY3 | ADH6 | 70% PO8 30% PO4 |

TABLE 6-continued

| Example | Structure | | | | | | |
|---|---|---|---|---|---|---|---|
| | 1.59 | 0.37 | 0.72 | 0.55 | 0.71 | 0.37 | 1.19 |
| Comp. 14 | 70% PO8 30% PO4 | ADH4 | ANY1 | ADH4 | 70% PO8 30% PO4 | | |
| | 1.81 | 0.39 | 1.10 | 0.39 | 1.81 | | |

The evaluation was conducted as follows. A 5"×8" piece of LOTIS paper was placed on a 10"×10" glass plate, a thin bead of vacuum grease was placed just off the edge of the paper, and a 7"×10" specimen of sample material was positioned on top of the glass plate such that it covered both the paper and the bead of vacuum grease. The "plated" sample then was put in a pouch made by Cryovac, Inc. under the commercial designation P640B. This material is a multilayer laminate having the general construction:

LLDPE/LLDPE+LDPE/LLDPE/adhesive/saran coated nylon 6.

This pouch was evacuated (60 second cycle) and sealed on a Koch X200™ tabletop vacuum chamber packaging machine. The plates were photo-reduced under fluorescent light, held in the over-pouch in the dark overnight, and photo-reduced again the next morning prior to beginning the actual oxygen transmission testing. Estimated oxygen transmission rates (OTR's) were determined using the methodology described in U.S. Pat. No. 5,316,949 (Bull et al.), U.S. Pat. No. 5,483,819 (Barmore et al.), and U.S. Pat. No. 5,583,047 (Blinka et al.). Samples were checked on Days 2, 12, and 26 after plating to simulate product hydration effects on the test materials during approximately the first month of storage.

Additional samples of Example 5, and Comp. Examples 9 and 12, were plated. These materials were stored underneath water-filled pouches of the same materials. These storage conditions were designed to simulate the hydration that the middle packages of column-stacked product in a case would experience under actual conditions.

All of the materials were subjected to conditions simulating hydration due to the packaged product (water activity ≈0.930) with normal external humidity levels (duplicated hydrating conditions of upper side of top package in a case). Comp. Ex 12, Comp. Ex. 9, and Example 5 also were tested simulating hydration due to packaged product plus hydration due to contact with another package (duplicated hydrating conditions of the middle package in a column stack in a case).

All of the materials exposed to normal external humidity levels had estimated oxygen transmission rates of between 6 and 10 cc/m²/24 hrs. after two days of hydration. After 12 days of hydration, Comp. Examples 9, 10, and 11 had estimated oxygen transmission rates less than 3.0, while all other materials had estimated oxygen transmission rates greater than 15.0. Comp. Examples 9 and 11 had estimated oxygen transmission rates less than 7.0 after 26 days of hydration, while all other materials tested had estimated oxygen transmission rates greater than 13 at the same time period. Twenty-six days was thought to be adequate to establish a hydration equilibrium in the materials under the test conditions.

The three materials tested under extreme hydrating conditions showed dramatically different estimated oxygen transmission rates after two days of hydration—6.7 cc (Comp. Example 12), less than 1 cc (Comp. Example 9), and 24.4 cc (Example 5), but these differences decreased as storage time, and, therefore, hydration time increased. After 43 days of hydration the estimated oxygen transmission rates of all three of these materials were practically equal: in the mid-40 cc range.

The results in Table 7 show little difference in the estimated oxygen transmission rates of the materials after two days of simulated product contact, with only Example 4 having a considerably higher oxygen transmission rate than the other materials. By Day 12 hydration effects were clearly being seen with Examples 4 and 5, and Comp. Examples 12 and 13 having appreciably higher oxygen transmission rates than the other three test materials. After 26 days of hydration Comp. Examples 9 and 11 still had oxygen transmission rates estimated as being equal to, or slightly lower than, that of the control after two days of hydration. The cast films do not, as a group, stand out from the blown films, either as being better or as being worse.

Table 8 shows the results for the selected materials that were tested under the extreme hydration conditions (plated samples held under water-filled pouches). This table shows marked differences between the materials during the first couple of weeks of storage, but an apparent equilibration of OTR's at the same point as storage time increased.

The results of these tests indicate that under conditions of a very high moisture moderate moisture gradient there are differences in ultimate oxygen transmission rates of the various materials tested; while under conditions of a very high moisture very high moisture system (practically no moisture gradient) the ultimate oxygen transmission rates may be essentially the same.

TABLE 7

Estimated OTR values for several vertical form-fill-seal materials subjected to conditions simulating product-induced hydration with normal external humidity levels.

| | Hydration Time (days) | | |
|---|---|---|---|
| Example | 2 | 12 | 26 |
| 4 | 10.1 | 31.8 | 42.4 |
| 5 | 8.4 | 20.0 | 26.5 |
| Comp. 9 | <7.0* | 2.6 | 6.8 |
| Comp. 10 | 7.0 | <1 | 13.8 |
| Comp. 11 | 7.0 | <1 | 5.9 |
| Comp. 12 | 7.2 | 16.3 | 19.9 |
| Comp. 13 | 7.0 | 13.4 | 26.2 |

TABLE 8

Estimated OTR values for several vertical form-fill-seal materials subjected to conditions simulating product-induced hydration with package-to-package contact.

| | Hydration Time (days) | | | |
|---|---|---|---|---|
| Example | 2 | 11 | 26 | 43 |
| 5 | 24.4 | 33.2 | 47.2 | 43.1 |
| Comp. 9 | <1 | <1 | 34.5 | 43.6 |
| Comp. 12 | 6.7 | 33.7 | 54.5 | 46.4 |

The physical properties of film structures of the invention produced for hot fill stretch resistance film development were determined. These film structures were made using a blown process, and/or were made with amorphous polyamide. Both the blown process and the addition of amorphous polyamide were demonstrated to impart hot fill stretch resistance to films used in vertical form/fill/seal applications, thereby improving pouch weight control.

The results are summarized in Tables 9 and 10. General trends noted from the results include a decrease in room temperature elongation when substituting amorphous polyamide for EVOH as well as when the EVOH layer is thickened; and an increase in modulus when using the blown process and when using amorphous polyamide instead of EVOH. The hot elongation results provide a measure of the hot fill stretch resistance of these films for reference and for comparison to applications test results. The tear propagation and instrumented impact resistance of the different structures varied and should be considered during qualification of a stretch resistant film with respect to easy-openability and abuse resistance. "L" refers to longitudinal direction; "T" to transverse direction; "Dir." refers to direction.

TABLE 9

| | Example 4 | | Example 5 | | Comp. 9 | | Comp. 10 | |
|---|---|---|---|---|---|---|---|---|
| | L | T | L | T | L | T | L | T |
| T & E: | | | | | | | | |
| Tensile at Yield (psi)[1] | 3100 | 3130 | 3490 | 3440 | 3390 | 3470 | 3560 | 3600 |
| Elong. at Yield (%)[1] | 16.1 | 16.2 | 16.7 | 16.5 | 16.6 | 16.7 | 16.4 | 15.9 |
| Tensile at Break (psi)[1] | 5110 | 5240 | 5170 | 5110 | 6790 | 7160 | 6420 | 6280 |
| Elong. At Break (%)[1] | 321 | 331 | 322 | 327 | 495 | 520 | 440 | 466 |
| Elastic Modulus (psi × 1000)[1] | 81.2 | 82.4 | 85.6 | 85.6 | 90.2 | 95.9 | 112.4 | 114.5 |
| Thickness (mil) | 5.25 | 5.26 | 5.46 | 5.30 | 5.37 | 5.11 | 3.34 | 3.27 |
| Hot Elong.[8]: | | | | | | | | |
| Stress at 5% Strain | 745 | 693 | 426 | 522 | 384 | 401 | 432 | 453 |
| Stress at 10% Strain | 817 | 767 | 556 | 635 | 582 | 604 | 625 | 643 |
| Stress at 15% Strain | 837 | 784 | 609 | 676 | 651 | 672 | 695 | 703 |
| Stress at 25% Strain | 843 | 797 | 643 | 704 | 680 | 702 | 720 | 717 |
| Thickness (mil) | 5.07 | 5.19 | 5.56 | 5.32 | 5.40 | 5.51 | 3.31 | 3.31 |
| Tear Prop.[2]: | | | | | | | | |
| Max Load (g) | 117 | 123 | 146 | 149 | 477 | 488 | 148 | 187 |
| Load at Break (g) | 90 | 97 | 112 | 118 | 448 | 474 | 120 | 150 |
| Thickness (mil) | 5.31 | 5.52 | 5.57 | 5.69 | 5.46 | 5.41 | 3.46 | 3.47 |
| Instr. Impact[3]: | | | | | | | | |
| Peak Load (N) | 112 | | 121 | | 121 | | 76 | |
| Gradient (N/mm) | 10.4 | | 13.2 | | 12.9 | | 8.4 | |
| Energy to Break (J) | 0.89 | | 0.88 | | 1.04 | | 0.51 | |
| Thickness (mil) | 5.30 | | 5.58 | | 5.50 | | 3.48 | |
| Optics: | | | | | | | | |
| Total Transmission | 93.0 | | 92.9 | | 92.6 | | 93.1 | |

TABLE 9-continued

|  | Example 4 | | Example 5 | | Comp. 9 | | Comp. 10 | |
| --- | --- | --- | --- | --- | --- | --- | --- | --- |
|  | L | T | L | T | L | T | L | T |
| (%)⁴ | | | | | | | | |
| Haze (%)⁵ | 8.1 | | 27.4 | | 27.7 | | 19.8 | |
| Clarity (%)⁶ | 21.0 | | 16.4 | | 20.5 | | 26.4 | |
| Gloss (45°)⁷ | 80 | | 52 | | 52 | | 56 | |
| Thickness (mil) | 5.24 | | 5.48 | | 5.42 | | 3.43 | |

TABLE 10

|  | Comp. 12 | | Comp. 13 | | Comp. 14 | |
| --- | --- | --- | --- | --- | --- | --- |
|  | L | T | L | T | L | T |
| T & E: | | | | | | |
| Tensile at Yield (psi) | 2630 | 2560 | 2790 | 2740 | 3260 | 3250 |
| Elong. At Yield (%) | 16.3 | 15.8 | 16.5 | 16.7 | 15.6 | 15.3 |
| Tensile at Break (psi) | 4910 | 4610 | 8360 | 7740 | 4270 | 4250 |
| Elong. At Break (%) | 375 | 342 | 545 | 518 | 264 | 261 |
| Elastic Modulus (psi × 1000) | 70.0 | 72.3 | 69.8 | 68.6 | 98.1 | 97.5 |
| Thickness (mil) | 5.70 | 5.41 | 5.78 | 5.57 | 5.11 | 5.12 |
| Hot Elong.: | | | | | | |
| Stress at 5% Strain | 369 | 392 | — | — | 767 | 795 |
| Stress at 10% Strain | 509 | 526 | — | — | 674 | 694 |
| Stress at 15% Strain | 559 | 570 | — | — | 664 | 681 |
| Stress at 25% Strain | 591 | 603 | — | — | 664 | 679 |
| Thickness (mil) | 5.36 | 5.20 | — | — | 5.10 | 4.97 |
| Tear Prop.: | | | | | | |
| Max. Load (g) | 204 | 224 | 429 | 421 | 1466 | 1435 |
| Load at Break (g) | 157 | 194 | — | — | 1076 | 1027 |
| Thickness (mil) | 5.62 | 5.39 | 5.48 | 5.53 | 5.22 | 5.28 |
| Instrumented Impact | | | | | | |
| Peak Load (N) | 71 | | 153 | | 123 | |
| Gradient (N/mm) | 10.6 | | 10.6 | | 9.3 | |
| Energy to Break (J) | 0.44 | | 1.24 | | 1.11 | |
| Thickness (mil) | 5.53 | | 5.67 | | 5.25 | |
| Optics: | | | | | | |
| Total Transmission (%) | 88.8 | | 93.4 | | 92.6 | |
| Haze (%) | 28.2 | | 5.5 | | 28.9 | |
| Clarity (%) | 0.9 | | 23.9 | | 20.8 | |
| Gloss (45°) | 66 | | 82 | | 52 | |
| Thickness (mil) | 5.82 | | 5.59 | | 5.13 | |

Additional films were tested. The results are summarized in Table 11 below. General trends noted from the results include seal strengths improved over most of the comparative examples on a per mil basis. Comparative Examples 15 and 16 are identified in Table 12 below.

TABLE 11

Physical Property Data

| Property | Dir. | Ex. 1 | Ex. 3 | Comp. 1 | Comp. 2 | Comp. 5 | Comp. 15 | Comp. 16 |
| --- | --- | --- | --- | --- | --- | --- | --- | --- |
| Gauge (mils) | | 4 | 3 | 4 | 3.5 | 4.5 | 15 | 3.5 |
| Modulus (psi) | MD | 149100 | 101500 | 167900 | 68000 | 73600 | 127800 | 96900 |
|  | TD | 142100 | 106000 | 175000 | 67200 | 74100 | 122800 | 78700 |
| Ultimate Tensile (psi) | MD | 7000 | 5400 | 8000 | 5300 | 5300 | 6300 | 5600 |
|  | TD | 6700 | 5400 | 7700 | 4700 | 5100 | 6200 | 4700 |
| Ultimate Elongation (%) | MD | 400 | 430 | 370 | 590 | 630 | 400 | 540 |
|  | TD | 390 | 460 | 370 | 530 | 610 | 430 | 480 |
| Energy To Break | MD | 42 | 37 | 40 | 39 | 40 | 41 | 42 |

TABLE 11-continued

Physical Property Data

| Property | Dir. | Ex. 1 | Ex. 3 | Comp. 1 | Comp. 2 | Comp. 5 | Comp. 15 | Comp. 16 |
|---|---|---|---|---|---|---|---|---|
| (lbs-in/mil) | | | | | | | | |
| | TD | 40 | 39 | 40 | 33 | 39 | 45 | 33 |
| Tear Resistance (gm/mil) | MD | 66 | 108 | 74 | | | na | |
| | TD | 78 | 112 | 82 | | | na | |
| Seal Strength (lbs/in) | MD Peel | 21.3 | 15 | 26 | 10.3 | 11.9 | 64.8 | 10.2 |

TABLE 12

| Example | Structure | | | | | | | |
|---|---|---|---|---|---|---|---|---|
| Comp. 15 | 96% aNY1 2% MB2 2% MB1 1.95 | ADH9 2.85 | 80% NY1 20% aNY1 0.98 | aNY1 3.0 | 80% NY1 20% aNY1 0.97 | ADH6 1.2 | 90% PO8 10% PO10 2.85 | 48% PO8 48% PO7 4% MB4 1.2 |
| Comp. 16 | 96% NY2 2% MB2 2% MB1 0.46 | ADH9 0.87 | 80% NY1 20% aNY1 0.23 | EVOH2 0.28 | 80% NY1 20% aNY1 0.23 | ADH6 0.28 | 90% PO8 10% PO10 0.87 | 88% PO08 10% PO10 2% MB3 0.28 |

The heat seal results were measured as a maximum force/linear inch of seal width, required to separate a heat seal of two plies of the film sample sealed to each other at a temperature of 370° F., for 0.5 seconds dwell time (3 seconds for the film of Comp. 15), cut in the machine direction. An Instron™ tester was used, with a 2 inch jaw separation, at a crosshead speed of 10 inches/minute.

Microwaveability studies were conducted using the Example 1 film structure. This structure lends itself to thermoforming with the property of reduced memory of the original shape of the material before it was formed.

Testing was also done on semi-rigid thermoformed trays containing PVC, and semi-rigid thermoformed trays containing amorphous polyester The results achieved with this product demonstrate that there is a significant difference from, and improvement over, the results experienced with semi-rigid materials made with PVC (poly(vinyl chloride)) or A-Pet (amorphous polyester).

The material of Example 1 retained the formed shape overall maintaining sides and a bottom while both the PVC and A-Pet trays lost the formed shape and the bottom would actually rise above the sides in some of the tests.

The ability of the film of the present invention to hold the formed shape during reheating of the product is a definite advantage and adds to the unique properties of the product.

Results are shown in Tables 13 to 15.

With respect to the data in Tables 13 to 15, note that:

All packages were filled with 250 ml of water.

"Form. Temp." is the forming temperature, i.e. the temperature at which the film was formed on a Multivacrm R7000 using 5×7 inch, 4 pocket tooling.

There were two forming depths used (1¼" and 2⅛") indicated by the initial volume held of approximately 650 ml and 1150 ml respectively.

The plug system on the Multivac™ R7000, available on this system to assist in forming the film and relaxing the memory, was not used in any of the samples shown in the Tables.

Cook Time: Time set on the microwave at full power. If more than one time is listed then microwave was set for subsequent times on the same package.

Boil Time: For the samples cooked for 5 minutes the products began boiling around the two minute mark and were considered to reach ~212° F. and held for two minutes at that temperature.

Cook Temperature: This is the temperature of the water as measured by inserting a probe of a Dickson™ 2500 Thermocouple Thermometer into the water after the microwave was shut off and the door was opened.

Vent and Open: A corner of the top was peeled back for the vented packages, whereas the top was completely removed on the open top packages.

Initial Volume: This is the Kg. of water held when the pocket was completely filled before cooking.

Final Volume: This is the Kg. of water held after the cook cycle with the pocket completely filled with water. These measurements were taken with the tray sitting on a scale as opposed to hanging in a form.

Percent loss: The amount of volume loss from the initial measurement to the measurement taken after the cook cycle.

Thus, film of the invention lends itself very well to microwaving, and forms easily in a thermoforming machine, and then retains its shape very well when heated to 200° F. in a microwave.

The PVC and A-Pet trays were formed at 115° and 125° C. respectively.

An attempt was made to establish a time that the material would last in the microwave, and so the test was started with a 2 minute microwave cycle. This proved to be disastrous for the PVC package with the distortion of the tray at about 90%, while the distortion of the A-Pet tray was at about 65%.

TABLE 13

Microwave Data: Example 1

| FORMING TEMP (° C.) | COOK TIME (min:sec) | COOK TEMP. (° F.) | Initial Volume | Final Volume | % LOSS |
|---|---|---|---|---|---|
| 100 | 2:00 | 171 | 1.145 | 0.96 | 16.2 |
| 120 | 2:00 | 176 | 1.155 | 0.895 | 22.6 |
| 120 | 2:00 | 184 | 1.085 | 0.885 | 18.5 |
| 130 | 2:00 | 177 | 1.2 | 0.945 | 21.3 |
| 130 | 2:00 | 181 | 1.22 | 1.015 | 16.9 |
| 140 | 2:00 | 175 | 0.685 | 0.655 | 4.4 |
| 140 | 2:00 | 178 | 1.125 | 0.955 | 15.2 |
| 140 | 2:00 | 184 | 1.27 | 1.075 | 15.4 |
| 140 | 2:00 | 197 | 0.705 | 0.605 | 14 |
| 150 | 2:00 | 179 | 0.735 | 0.68 | 7.5 |
| 150 | 2:00 | 180 | 0.66 | 0.635 | 3.8 |
| 160 | 2:00 | 185 | 0.68 | 0.64 | 5.9 |
| 160 | 2:00 | 186 | 0.68 | 0.68 | 0 |
| 100 | 5:00 | 212 | 1.055 | 0.515 | 51.2 |
| 120 | 5:00 | 212 | 1.085 | 0.585 | 46.1 |
| 130 | 5:00 | 212 | 1.115 | 0.73 | 34.6 |
| 140 | 5:00 | 212 | 0.695 | 0.455 | 34.5 |
| 140 | 5:00 | 212 | 1.225 | 0.76 | 38 |
| 150 | 5:00 | 212 | 0.68 | 0.415 | 39 |
| 160 | 5:00 | 212 | 0.65 | 0.485 | 25.4 |

Notes:
Example 1 is a totally coextruded structure, i.e. not adhesively laminated. Example 1 has a core consisting essentially of amorphous polyamide. This core layer makes up 20% of the film structure's total thickness.

TABLE 14

Microwave Data: Control APET film

| FORM TEMP (° C.) | COOK TIME (min:sec) | COOK TEMP. (° F.) | Initial Vol. | Final Vol. | % LOSS | Comments |
|---|---|---|---|---|---|---|
| 130 | 1:00 | 117 | 0.69 | 0.365 | 48.2 | Sides down to ⅓ original height |
| 115 | 1:00 | 126 | 0.69 | 0.145 | 79 | No gross change of shape |
| 130 | 1:00 | 162 | nd | Nd | Nd | |
| 115 | 1:00 | 177 | nd | Nd | Nd | Water ran out side |
| 130 | 1:00 | 190 | nd | Nd | Nd | |

TABLE 14-continued

Microwave Data: Control APET film

| FORM TEMP (° C.) | COOK TIME (min:sec) | COOK TEMP. (° F.) | Initial Vol. | Final Vol. | % LOSS | Comments |
|---|---|---|---|---|---|---|
| 115 | 1:00 | 198 | nd | Nd | Nd | Both sides down |
| 130 | 2:00 | 167 | 0.73 | 0.59 | 19.2 | |
| 115 | 2:00 | 170 | 0.74 | 0.52 | 29.8 | Sides down ½ |
| 115 | 5:00 | 205 | 0.72 | 0 | 100 | Sides down at 2:00 minutes |
| 130 | 5:00 | 209 | 0.75 | 0.235 | 68.7 | Sides down to ⅓ |

TABLE 15

Microwave Data: Control PVC film

| FORM TEMP (° C.) | COOK TIME (min:sec) | COOK TEMP. (° F.) | Initial Vol. | Final Vol. | % LOSS | Comments |
|---|---|---|---|---|---|---|
| 130 | 1:00 | 116 | 0.74 | 0.285 | nd | |
| 115 | 1:00 | 120 | Nd | Nd | nd | Slightly deformed |
| 130 | 1:00 | 160 | Nd | Nd | 61.5 | |
| 115 | 1:00 | 165 | Nd | Nd | nd | No Change |
| 115 | 1:00 | 187 | 0.715 | 0 | 100 | Sides down 100% |
| 130 | 1:00 | 188 | nd | Nd | nd | |
| 130 | 5:00 | 205 | 0.755 | 0 | 100 | Sides down 100% at 3:25 minutes. |
| 115 | 5:00 | 210 | 0.76 | 0 | 100 | No sides left |

Notes:
The PVC control is a 14 mil thick PVC film adhesively laminated to a 2 mil blown sealant having the structure:
Sealant/adhesive/Nylon/EVOH/Nylon/adhesive/bulk
The total gauge of the PVC control was thus 16 mil.
The "APET" control is 11 mil amorphous polyester film adhesively laminated to 2 mil P363. Total gauge = 13 mil.
nd = not determined A film of the invention, and comparative films, were evaluated for their moisture vapor transmission rate (MVTR), and their oxygen transmission rate (OTR) under wet (100% RH) and dry (0% RH) conditions, where "RH" is relative humidity. The results are shown in Table 17. WVTR was measured according to ASTM F 1249-90. OTR was measured according to ASTM D 3985-95.

The films not already identified hereinabove are identified in Table 16.

TABLE 16

| Example | Structure | | | | | | |
|---|---|---|---|---|---|---|---|
| Comp. 17 | 70% PO8 30% PO4 | ADH6 | NY3 | ADH6 | NY3 | ADH6 | 70% PO8 30% PO4 |
| | 1.25 | 0.35 | 0.65 | 0.50 | 0.65 | 0.35 | 1.25 |
| Comp. 18 | 70% PO8 30% PO4 | ADH6 | NY3 | ADH6 | NY3 | ADH6 | 70% PO8 30% PO4 |
| | 1.25 | 0.35 | 0.65 | 0.50 | 0.65 | 0.35 | 1.25 |
| Comp. 19 | 70% PO8 30% PO4 | ADH6 | NY3 | EVOH1 | NY3 | ADH6 | 70% PO8 30% PO4 |
| | 1.38 | 0.38 | 0.71 | 0.55 | 0.71 | 0.38 | 1.38 |

TABLE 17

| Example | MVTR (grams/100 in²-day-atm.) | OTR (0% RH) (cc/m²-day-atm.) | OTR (100% RH) (cc/m²-day-atm.) |
|---|---|---|---|
| 5 | 0.23 | 27.5 | 16.9 |
| Comp. 13 | 0.31 | 1.17 | 70.6 |
| Comp. 17 | 0.35 | 37.2 | 129 |
| Comp. 18 | 0.34 | 53.0 | 177 |
| Comp. 19 | 0.27 | 3.26 | 62.6 |

Additional OTR testing was done on several films. For each case, the film was tested on a Mocon™ analyzer with the humidity at 100% RH on the $N_2$ side of the sample, and 50% RH on the $O_2$ side of the sample.

The films not already identified hereinabove are identified in Table 18. Comp. 22 is a 5.5 mil thick blown film with a core layer of a polymeric adhesive, a first intermediate layer, on a first side of the core layer, of a nylon 6, and a second intermediate layer, on the second side of the core layer, of an EVOH. Thus, Comp. 22 is asymmetric in construction. Table 19 shows this material tested in each of the two possible orientations: the EVOH "side" of the film oriented toward the 100% RH (N2) side of the sample ("Orient$_1$" in the table), and the EVOH "side" of the film oriented toward the 50% RH ($O_2$) side of the sample ("Orient$_2$" in the table).

TABLE 18

| Example | Structure | | | | | | |
|---|---|---|---|---|---|---|---|
| Comp. 20 | 70% PO6 30% PO4 1.25 | ADH6 0.35 | NY3 0.65 | EVOH2 0.50 | NY3 0.65 | ADH6 0.35 | 70% PO6 30% PO4 1.25 |
| Comp. 21 | 70% PO6 30% PO4 1.12 | ADH6 0.32 | NY3 0.58 | EVOH2 0.46 | NY3 0.58 | ADR6 0.32 | 70% PO6 30% PO4 1.12 |
| Comp. 22 | LLDPE | Adhesive | Nylon 6 | EVOH1 | Nylon 6 | Adhesive | LLDPE |

TABLE 19

| Example | OTR (50% RH/100% RH) (cc/m²-day-atm.) |
|---|---|
| 5 | 10.61 |
| Comp. 12 | 6.14 |
| Comp. 13 | 6.49 |
| Comp. 20 | <0.2 |
| Comp. 21 | 2.01 |
| Comp. 22 (Orient$_1$) | 3.08 |
| Comp. 22 (Orient$_2$) | 1.76 |

Films of the present invention are preferably made by tubular blown or cast coextrusion.

Films of the present invention are preferably not heat shrinkable, since this property would negate the dimensional stability at elevated temperatures which is required for the primary intended end-use applications, i.e. for vertical form/fill/seal uses. However, for other applications where dimensional stability at elevated temperatures is not required or desired, films can be stretch oriented by convention orientation processes well known in the art, such as the trapped bubble or tenter frame processes, to render the material heat shrinkable. In such cases, films of the present invention can optionally be crosslinked by irradiation, or chemically.

Internal fitments, such as the Asept™ fitment distributed in the U.S. by the assignee of the present application, and disclosed in U.S. Pat. No. 4,603,793 (Stern), can be optionally sealed to the interior surface of a pouch wall of a pouch made from the film of the present invention.

In general, the multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.5 to 10 mils (1 mil equals 0.001 inch); more preferably, from about 1 to 6 mils; and still more preferably, from 3.5 to 5.5 mils.

The polymer components used to fabricate multilayer films according to the present invention can also contain appropriate amounts of other additives normally included in such compositions. These include slip agents, antioxidants, fillers, dyes, pigments, radiation stabilizers, antistatic agents, elastomers, and other additives known to those of skill in the art of packaging films.

It is to be understood that variations of the present invention can be made without departing from the scope of the invention, which is not limited to the specific embodiments and examples disclosed herein, but extends to the claims presented below.

The invention has described herein primarily with reference to vertical form/fill/seal (VFFS) packaging of flowable products such as water, milk, juices, sauces, soups, toppings, highly spiced products including ketchup and salsa, and the like, as well as non-flowable products such as bulk cheese, such as shredded cheese, and individual quick frozen (IQF) applications such as chopped meat for fahitas. Such applications benefit from reduced stretching of horizontal (transverse) seals which are still hot just after the sealing step. In conventional packaging materials, these hot seals sometimes undesirably stretch or elongate as a result of the weight of the product applying a load to the package. This phenomenon can adversely affect seal integrity, and package dimensional uniformity. The present invention demonstrates improvements in resistance to stretching of hot seals in VFFS applications. Conventional VFFS packages can also experience some overall package distortion or elongation as a result of the weight of the product, dependent on such variables as the nature, weight, and temperature of the product, and the type of packaging material. The present invention demonstrates improved resistance to stretching of the overall package. This dimensional stability results in more predictable packaging sizing and more uniform package weights, an advantage for the food processor. Also, good wet (high relative humidity) oxygen barrier, compared to conventional films containing EVOH, and good easy-tear (low tear propagation) is also obtained. Highly spiced products, e.g. the ketchup and salsa mentioned earlier, benefit from the aroma barrier properties of films of the present invention.

High seal strengths are obtained by the films of the present invention. These are further disclosed in Table 10 below.

The present invention also offers good aroma barrier in connection with the packaging of beverages, essential oils, fragrance, herbicides, pesticides, fertilizers, cosmetics, etc.

The high stiffness (high tensile modulus) of the present film makes it very suitable for end-uses where good machinability, i.e. ability to track well through a machine, especially a high-speed machine, is desirable.

The present invention is also useful in horizontal form/fill/seal (HFFS) end-uses, e.g. in packaging block cheese. In such uses, an ethylene/vinyl acetate copolymer sealant layer is a preferred outer layer or outer layers. An example of a film of the present invention especially useful in HFFS applications is shown as Example 6 in Table 20.

Also, films of the present invention can be used to make semi-rigid trays, and to make thermoformable film. The latter can be made with thicknesses of 4 to 30 mils, and possibly higher, thermoformable at temperatures of 80 to 180° C. These films show better stiffness (higher tensile modulus) than laminates of comparable gauge containing PVC. Non-forming webs, i.e. top webs to be used as lidstock with a trayed package, can also be made from films of the present invention. Products such as hot dogs can be packaged in a tray or other support, with films of the present invention as a non-forming top web.

The present film can be beneficially used to make a bottom web for vacuum skin packages (VSP). In non-forming end-uses, a preferred formulation includes a first outer layer (layer farthest away from the product to be packaged) comprising a nylon 6 or other semicrystalline polyamide, and a second outer layer (layer closest to the product to be packaged) comprising a polyolefin such as EAO, polypropylene, or propylene copolymer. The outer layer supplies abuse resistance; the inner layer supplies heat sealability. An example of a film of the present invention especially useful in VSP semi-rigid bottom web applications is shown as Example 7 in Table 20.

polyester film, can now be provided by a fully coextruded film without the need for additional discrete films to be glued thereto.

For stand-up pouches, high stiffness offered by the present films provides better package presentation on retail shelves. Aroma, oxygen, and ultraviolet barrier properties are also benefits of the present film useful in stand-up pouch applications.

The present invention is also useful in high strength industrial applications, e.g. as dunnage bags.

Films of the invention can be surface printed or trapped printed; can be symmetric or asymmetric in construction; and can be used to produce pouches with lap seals or fin seals. For example, the present invention can be used to make symmetric, seven layer (A/B/C/D/C/B/A) structures on VFFS packaging equipment such as the Onpack™ equipment supplied by Cryovac, Inc. Pouches thus made will typically have longitudinal lap seals. In contrast, the present invention can also be used to make asymmetric, seven layer (A/B/C/D/C/B/E) structures on VFFS packaging equipment such as the Ultimate™ equipment supplied by Hayssen. Pouches thus made will typically have longitudinal fin seals.

Films of the present invention also exhibit good deadfold properties at higher thicknesses. By "deadfold" herein is meant a fold that does not spontaneously unfold; a crease.

What is claimed is:

1. A multilayer film comprising:
   a) a core layer consisting essentially of an amorphous polyamide;
   b) two intermediate layers, disposed on opposite surfaces of the core layer, comprising a semicrystalline polyamide;
   c) two adhesive layers, each disposed on a surface of the respective intermediate layer, comprising a polymeric adhesive; and
   d) two outer layers, each disposed on a surface of a respective adhesive layer, comprising a material selected from the group consisting of amorphous polyamide, semicrystalline polyamide, ethylene/alpha olefin copolymer, propylene homopolymer, and propylene/alpha olefin copolymer;

wherein the film has a total thickness of between 0.5 and 10 mils; and wherein the film exhibits a free shrink of less than 5% in the longitudinal direction, and less than 5% in the transverse direction, at 180° F.

TABLE 20

| Example | Structure | | | | | | | |
|---|---|---|---|---|---|---|---|---|
| 6 | 96% NY2 | ADH9 | 80% NY1 | aNY1 | 80% NY1 | ADH6 | 90% PO8 | PO14 |
|  | 2% MB2 |  | 20% aNY1 |  | 20% |  | 10% |  |
|  | 2% MB1 |  |  |  | aNY1 |  | PO10 |  |
|  | 0.40 | 0.72 | 0.19 | 0.30 | 0.19 | 0.24 | 0.72 | 0.24 |
| 7 | 96% NY2 | ADH9 | 85% NY3 | ADH | 85% NY3 | ADH6 | 90% PO2 | 50% PO10 |
|  | 2% MB2 |  | 15% aNY1 |  | 15% |  | 10% | 35% PO15 |
|  | 2% MB1 |  |  | 6 | aNY1 |  | PO10 | 15% PO1 |
|  | 1.04 | 1.92 | 0.52 | 0.80 | 0.52 | 0.64 | 1.92 | 0.64 |

A major advantage of the present invention is that the physical property of high stiffness, i.e. high tensile modulus, conventionally supplied by laminates having a coextruded substrate and, glued thereto, a biaxially oriented nylon or 2. The film of claim 1 wherein the amorphous polyamide of the core layer is selected from the group consisting of nylon 6I/6T, nylon 6,6/6,9/6I, and nylon 6,6/610/MXD-6.

3. The film of claim 1 wherein the semicrystalline polyamide is selected from the group consisting of nylon 6, nylon 9, nylon 11, nylon 12, nylon 66, nylon 69, nylon 610, nylon 612, nylon 6/12, nylon 6/69, nylon 66/610, nylon 6/66, nylon 66/6, nylon 12T, nylon 6T, and nylon 666.

4. The film of claim 1 wherein the intermediate layers each comprise a blend of a semicrystalline polyamide and an amorphous polyamide.

5. The film of claim 1 wherein the polymeric adhesive layers each comprise a polymeric adhesive selected from the group consisting of anhydride grafted ethylene/1-butene copolymer, anhydride grafted ethylene/1-hexene copolymer, and anhydride grafted ethylene/1-octene copolymer.

6. The film of claim 1 wherein the first outer layer comprises an ethylene/alpha-olefin copolymer having a density of between 0.916 and 0.945 grams per cubic centimeter.

7. The film of claim 1 wherein the first outer layer comprises a propylene/ethylene copolymer.

8. The film of claim 1 wherein the first outer layer comprises a single site-catalyzed ethylene/alpha-olefin copolymer.

9. The film of claim 1 wherein the film is not oriented.

10. A method of packaging a food product comprising:
   a) providing a rollstock film, the film comprising
      i) a core layer consisting essentially of an amorphous polyamide;
      ii) two intermediate layers, disposed on opposite surfaces of the core layer, comprising a semicrystalline polyamide;
      iii) two adhesive layers, each disposed on a surface of the respective intermediate layer, comprising a polymeric adhesive; and
      iv) two outer layers, each disposed on a surface of a respective adhesive layer, comprising a material selected from the group consisting of amorphous polyamide, semicrystalline polyamide, ethylene/alpha olefin copolymer, propylene homopolymer, and propylene/alpha olefin copolymer, wherein the film has a total thickness of between 0.5 and 10 mils; and wherein the film exhibits a free shrink of less than 5% in the longitudinal direction, and less than 5% in the transverse direction, at 180° F.;
   b) forming the film into a tube in a vertical/form/fill/seal process;
   c) filling the tube with a food product; and
   d) closing the tube to form a sealed pouch containing the food product.

11. A package comprises:
   a) a flowable food product; and
   b) a pouch containing the food product, the pouch made from a film comprising
      i) a core layer consisting essentially of an amorphous polyamide;
      ii) two intermediate layers, disposed on opposite surfaces of the core layer, comprising a semicrystalline polyamide;
      iii) two adhesive layers, each disposed on a surface of the respective intermediate layer, comprising a polymeric adhesive; and
      iv) two outer layers, each disposed on a surface of a respective adhesive layer, comprising a material selected from the group consisting of amorphous polyamide, semicrystalline polyamide, ethylene/alpha olefin copolymer, propylene homopolymer, and propylene/alpha olefin copolymer, wherein the film has a total thickness of between 0.5 and 10 mils; and wherein the film exhibits a free shrink of less than 5% in the longitudinal direction, and less than 5% in the transverse direction, at 180° F.

* * * * *